2,881,144
Patented Apr. 7, 1959

2,881,144

ALKYD RESINS FROM DICYCLOPENTADIENE DICARBOXYLIC ACIDS AND POLYHYDRIC ALCOHOLS

Charles A. Cohen, Roselle Park, N.J., and Louis A. Mikeska, Dunedin, Fla., assignors to Esso Research and Engineering Company, a corporation of Delaware No Drawing. Application August 23, 1955
Serial No. 530,198

12 Claims. (Cl. 260—22)

This invention relates to the production of polycyclic dibasic acids and of improved surface coating compositions made from the same. This application is a continuation-in-part of copending applications, Serial No. 268,122, filed January 24, 1952 now Patent No. 2,716,662, and Serial No. 510,561, filed May 23, 1955, now Patent No. 2,848,485.

More particularly, this invention is concerned with a novel process for the production of alkyd resins derived from dicarboxylic acids which have been produced primarily from cyclopentadiene, alkyl-substituted cyclopentadienes, hydrogenated derivatives of cyclopentadiene and mixtures thereof.

In a preferred aspect, this invention is concerned with the production of new and useful oil-modified and/or fatty acid modified alkyd resins derived from dicyclopentadiene dicarboxylic acid compounds such as dicyclopentadiene dicarboxylic acid, alkyl dicyclopentadiene dicarboxylic acids such as methyl and dimethyl dicyclopentadiene dicarboxylic acids, dicarboxylic acids derived from mixtures of cyclopentadiene and methyl and dimethyl dicyclopentadiene, and/or hydrogenated derivatives of the above dicarboxylic acids per se or in admixture. The above dicarboxylic acids comprise the subject matter of the above-identified patent applications and are coreacted in an amount of 100 to 150 parts by weight with 20 to 60 parts by weight of a polyfunctional alcohol preferably containing at least 3 hydroxyl groups, in the presence of 50 to 300 parts by weight of certain oils or fatty acids. Reaction temperatures vary between about 350° to 500° F., especially about 350° to 450° F., the maximum times required at said temperatures being about 10 hours to as low as 0.5 hour, about 1–4 hours being normally adequate. The oils which are preferably fatty oils advantageously comprise about 40 to 70 weight percent of the total composition whereas fatty acids generally comprise about 30 to 60 weight percent thereof.

Starting with cyclopentadiene one obtains according to the process of this invention, alpha-dicyclopentadiene-3,7-dicarboxylic acid which was first prepared by Thiele: Berichte 34, 68 (1901) by treating cyclopentadiene with metallic potassium with subsequent gassing of the potassium cyclopentadiene with carbon dioxide at atmospheric pressure. Decomposition of the di-potassium salt with acid yielded the above dicyclopentadiene dicarboxylic acid. As he stated in a footnote, Thiele's attempts to cause cyclopentadiene to react with sodium were unsuccessful.

It has been found that dicyclopentadiene dicarboxylic acid and other dialkyl homologues of this acid may be readily prepared in high yields by reacting metallic sodium which has been dispersed to a finely divided state, that is, to an average particle size of less than 50 microns in diameter, with monomeric cyclopentadiene or alkyl cyclopentadiene in the presence of a small amount of an anhydrous alcohol activator, followed by conversion of the sodium cyclopentadienes to acid by treatment with $CO_2$ preferably at superatmospheric pressures up to 1000 p.s.i.g.

The sodium employed in this reaction is in the form of a finely divided dispersion wherein the particles have an average size of less than 50 microns in diameter. Dispersion is obtained, for example, by mechanical means either with or without the aid of emulsifying or dispersing agents. The alcohol activator is substantially anhydrous alcohol, such as the low molecular weight aliphatic alcohols such as methanol, ethanol, isopropanol, etc. Alcohols containing up to four carbon atoms per molecule are suitable but methanol, ethanol or isopropanol are preferred. The alcohol is employed in relatively small amounts, that is, less than 1 mol equivalent based on the sodium and usually in amounts less than ⅒ mol equivalent. The alcohol serves to activate the sodium either by removing surface impurities contained thereon or by forming small quantities of sodium alcoholate. Gassing with carbon dioxide is carried out at pressures above atmospheric, up to 1000 p.s.i.g., for best yields. Good reaction is obtained at 50 to 1000 lbs. but since the tank pressure of $CO_2$ as handled commercially is usually about 900 to 1000 p.s.i.g. this latter pressure is preferred.

While frequent reference is made in the literature to the use of metallic potassium for reacting with the methylene group of cyclopentadiene so as to form cyclopentadienyl potassium, no references have been found where the corresponding sodium salt was made by direct reaction of sodium with cyclopentadiene. If sodium is previously dispersed to a very finely divided state, preferably having a particle size of less than 50 microns in diameter, e.g., by mixing with xylene, heating to above the melting point of the sodium and then passing the mixture through a high-speed colloid mill and continuing the operation until the temperature falls below the solidification point of the sodium, one obtains the sodium in a highly reactive state. With sodium in such a finely divided state some reaction may be obtained with cyclopentadiene, but the reaction tends to be relatively slow. If to a mole of dispersed sodium there is added 1 to 2 grams of anhydrous ethyl or isopropyl alcohol so as to activate the sodium either by removing, by means of solution, surface impurities or by forming small quantities of sodium alcoholate, immediate reaction may be obtained when a mole of monomeric cyclopentadiene is added to the dispersed sodium. Under these conditions the cyclopentadienyl sodium is readily formed, and when this sodium salt is then transferred to a suitable pressure-resistant vessel and treated at super-atmospheric pressure with carbon dioxide one obtains almost exclusively the disodium salt of the dicyclopentadiene dicarboxylic acid having a minimum of sodium carbonate or bicarbonate present. In distinction to the use of carbon dioxide under pressure, if one gasses the mixture of the sodium or potassium cyclopentadiene with carbon dioxide at atmospheric pressure a large proportion of the mixture ends up as sodium carbonate or bicarbonate, giving ultimately poor yields of the desired dicarboxylic acid.

The dicyclopentadiene dicarboxylic acid has many useful properties industrially, e.g., higher alcohol esters of either the unsaturated acid or the fully hydrogenated acid are useful as solvents and plasticizers for resins and coating materials. It is also useful as a modifier for the production of alkyd resins when mixed with other suitable ingredients and may serve as a basic material for the production of polyester types of lubricants, as an ingredient of specialty greases and as a source of other compounds.

The production of conventional alkyd resins generally involves the condensation of a trifunctional alcohol and a dibasic acid. Such alkyd resins may be prepared from phthalic anhydride and glycerol. The basic resin may then be modified by incorporating therein certain saturated and unsaturated fatty acids, non-drying oils, semi-drying oils, drying oils, maleic anhydride-treated oils, styrenated oils, dihydric and polyhydric alcohols such as ethylene glycol, and pentaerythritol, as well as mono- and di-glycerides. For a review of the development of alkyd-type resins reference may be made to "Industrial and Engineering Chemistry," vol. 41, pages 716, 726 (1949).

A major factor in the cost of production of all alkyd resins and especially alkyd resins derived from polyfunctional alcohols with dibasic acids such as phthalic anhydride is the relatively high temperatures and long times required in cooking varnishes made from said resins in order to obtain a commercially acceptable low acid number, viscosity, etc.

It has now been discovered that, if dicyclopentadiene dicarboxylic acid and/or its above-mentioned alkyl or hydrogenated derivatives are substituted for phthalic anhydride in a typical alkyd resin formulation, the cooking time may be drastically reduced and lower temperatures may be employed and yet resins characterized by satisfactory acid numbers and viscosities may be obtained. Surface coatings derived from the aforesaid acids, according to the invention, of both the pigmented and unpigmented type, exhibit superior drying rates, surface hardness, and gloss. The alkyd resins according to the present invention further have excellent resistance to water, grease, alkalies, and superior weathering characteristics.

While the aforesaid lower cooking temperature and drastically shorter cooking time required when using the dicyclopentadiene dicarboxylic acids according to the present invention, generally holds for most alkyd resins and especially oil-modified alkyd resins; the above effects are most pronounced when employing said acids in conjunction with such materials as dehydrated castor oil or soya acids and oils. Modifications to any given basic alkyd resin formulation according to the present invention may be made in which the dicyclopentadiene dicarboxylic acids replace phthalic anhydride in toto or in part or may comprise mixtures of dicyclopentadiene dicarboxylic acids with maleic acid, fumaric acid, and/or other acids reactive with polyfunctional and especially trifunctional alcohols. The alkyd resins of the present invention, made from aforesaid dicyclopentadiene dicarboxylic acids, may also be mixed with other surface coating compositions such as phenolic resins and/or oleoresinous varnishes.

The following examples more fully explain the present invention but are not to be considered as limiting since they are given for the purposes of illustration only:

EXAMPLE 1.—CYCLOPENTADIENYL SODIUM

Twenty-three grams of sodium are added to 500 ml. of xylene contained in a one-liter stainless steel beaker which is heated by means of a hot plate to a temperature of 120°–125° C. At this point a homogenizer-type of mixer, available commercially as a "Homomixer," is immersed into the mixture of molten sodium in xylene and the mixer run for a period of approximately 15 seconds. At the completion of the run, the mixer is rinsed with approximately 100 ml. of xylene so as to wash off occluded sodium, and the entire mixture of dispersed sodium in xylene transferred to a one-liter flask fitted with an efficient stirrer, thermometer, dropping funnel, and reflux condenser.

To the well-stirred mixture is then added 80 g. of freshly cracked and distilled monomeric cyclopentadiene boiling at 40°–41° C., representing a 20% excess of the diolefin over the sodium. Just prior to addition of the diolefin there is added to the flask one or two ml. of anhydrous ethanol or isopropanol. With addition of the diolefin an immediate rise in temperature is noted, and the temperature of the flask contents is maintained within the limits of 30°–35° C. by means of external cooling, using if necessary, a bath composed of solid carbon dioxide and alcohol. Addition time for the diolefin is usually in the neighborhood of one hour, and further stirring is continued for at least another hour at the same temperature in order to insure full reaction. The sodium changes from a dark gray powder to a voluminous precipitate having a white to a light gray appearance.

The cyclopentadienyl sodium may be reacted with alkyl halides, acid chlorides or esters of chloracetic acid to give respectively: dialkyl dicyclopentadiene, diketones of dicyclopentadiene, and bis (carboxymethyl esters) of dicyclopentadiene.

EXAMPLE 2.—DISODIUM DICYCLOPENTADIENE DICARBOXYLIC ACID

The flask contents from Example 1 are then charged to a bomb capable of withstanding pressure in excess of 1000 lbs. The bomb should be of a suitable resistant material such as stainless steel, nickel, Inconel, Monel or may be a silver-lined bomb. The bomb is fastened into a shaking machine and charged with full tank pressure of carbon dioxide which will normally be within the limits of 900–1000 lbs. per sq. in. gage. When charging with carbon dioxide an immediate rise in temperature is noted and a fall in pressure in a closed system occurs indicating rapid reaction of the carbon dioxide. The system is repressured over a period of ½ hour to full tank pressure until no further pressure drop is noted. The mixture is then allowed to shake for a period of approximately 12 hours, during which time the initial rise in temperature to about 60° C. may be increased by external heating to about 100° C. Additional heating is not entirely necessary in order to obtain complete reaction but does hasten the reaction time so that with heating, as little as 2 hours is sufficient. Shorter times may be employed if better mixing is available, such as propeller or turbo mixers. At the completion of the run the excess carbon dioxide is bled off, the bomb contents dumped into a Buchner funnel, and the salt washed with light naphtha or ethyl ether in order to remove excess solvent and small amounts of polymer. There is obtained a yield of from 128 to 134 g. of product varying in color from white to a light cream color. The material has a low density and very fine particle size, exhibiting fluid flow characteristics in a dry state.

EXAMPLE 3.—DICYCLOPENTADIENE DICARBOXYLIC ACID

The sodium salt prepared in Example 2 is conveniently converted to the free acid by dissolving the salt in water, boiling for a few minutes and precipitating the acid by addition of dilute HCl and recovering the acid crystals by filtration. The crude product is recrystallized from approximately 50% aqueous methanol or approximately 70% aqueous acetic acid. A perfectly white crystalline acid is obtained having a melting point of 210° C. and a neutralization equivalent equal to 509 mgm. KOH/gm. It possesses a formula which may be illustrated by the following structure:

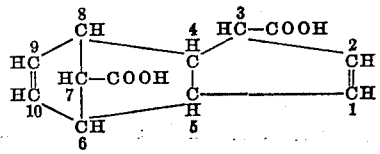

The above reactions described in Examples 1, 2, and 3 are believed to be adequately described by the following series of equations:

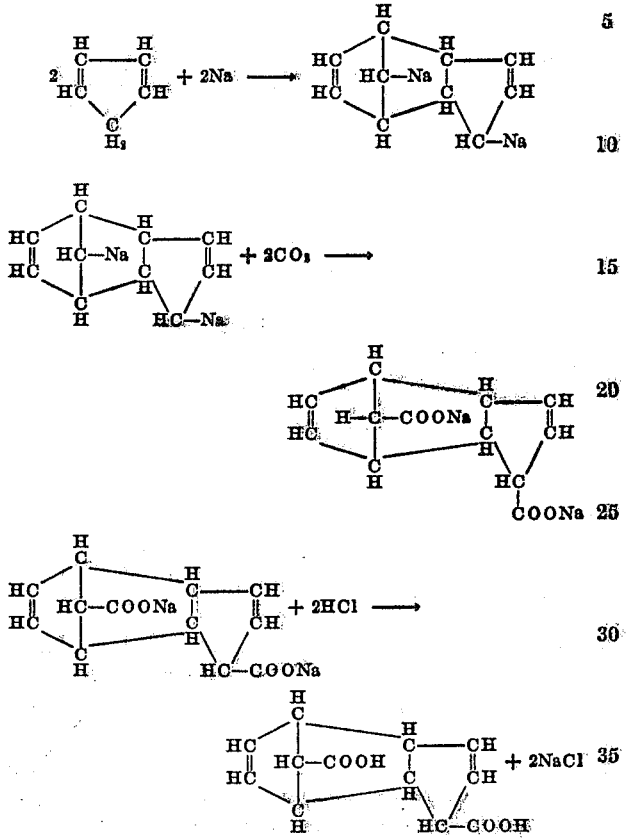

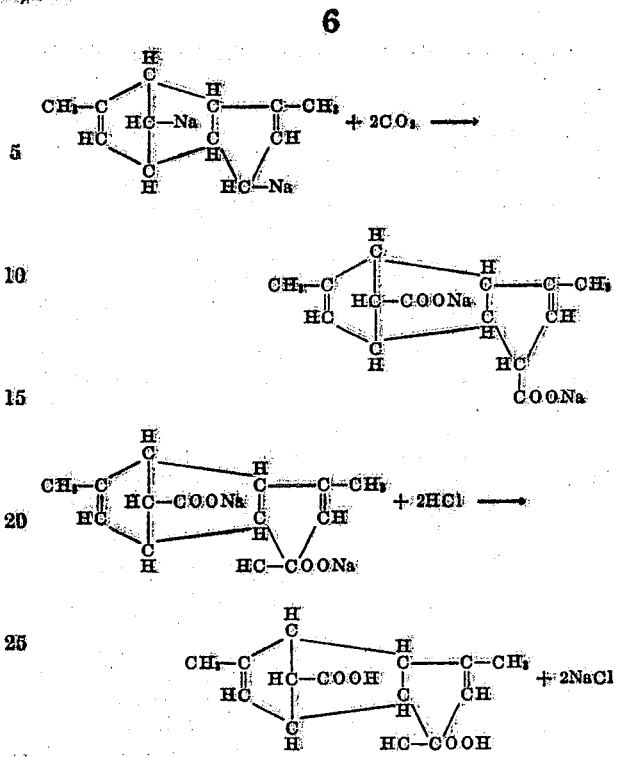

*Note.—Position of methyl radical (CH₃) shown in above equations is not known with certainty, and is for illustration only.*

Although the above examples describe the preparation of dicarboxylic acids from relatively pure cyclopentadiene and methyl cyclopentadiene, good yields of high quality acids are also obtained by reacting mixtures of these two components, for example, suitable mixtures may contain 90–10% of cyclopentadiene and 90–10% of methyl cyclopentadiene. In addition, vapor phase steam-cracked hydrocarbons boiling in the range of cyclopentadiene and methyl cyclopentadiene containing paraffins and aromatics as diluents may also be employed. The products comprise a mixture of the two acids, namely, dicyclopentadiene dicarboxylic acid and dimethyldicyclopentadiene dicarboxylic acid.

EXAMPLE 4.—DISODIUM DIMETHYL DICYCLOPENTADIENE DICARBOXYLIC ACID

Seventy-five grams of methylcyclopentadiene (boiling point 73° C.) was reacted at a temperature of 30° C. with 23 grams of sodium dispersed in 500 ml. of xylene. The sodium salt was then transferred to a silver-lined bomb having a capacity of 1.8 liters and charged with $CO_2$ at a gage pressure of 940#/sq. inch. An immediate rise in temperature and a drop in pressure occurred indicating extensive reaction. The bomb was repressured and allowed to shake for 3 hours without additional heating being applied.

On opening the bomb, filtering the solid and washing with ether a white solid salt was obtained weighing 135.8 grams. Decomposition of the salt with acid and recrystallization from 70% acetic acid yielded a white acid, melting at 222–223° C. having a neutralization equivalent of 452 mgm. KOH/gm. Analysis by combustion gave the following:

|  | Found | Theor. $C_{14}H_{16}O_4$ |
|---|---|---|
| Percent Carbon | 67.12 | 67.72 |
| Percent Hydrogen | 6.63 | 6.50 |

The following equations represent the chemical reactions involved in this preparation.

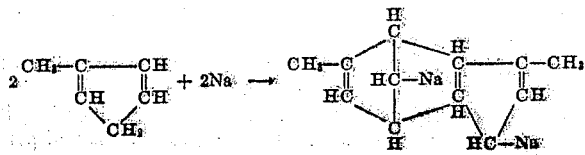

Hydrogenated dicyclodiene carboxylic acids in alkyd resins

It is known that the dimethyl ester of dicyclopentadiene dicarboxylic acid can depolymerize to the monomeric methyl ester of cyclopentadiene carboxylic acid when heated to cracking temperatures of about above 200° C. It has now been discovered that progressive hydrogenation of the acids of the invention to the dihydro and tetrahydro dicyclopentadiene dicarboxylic acids and alkyl derivatives thereof imparts improved stability to the resulting acids and esters thereof and also renders said acids more suitable for use in the production of certain alkyd resins of the invention where the reactive compounds and resins are subjected to high temperatures.

A representative process of the present invention involves making a cyclodienyl sodium compound as above-described, by reacting at pressures of about 50 to 1000 p.s.i.g. monomeric cyclopentadiene with very finely divided metallic sodium at temperatures of about 10° to 40° C. in the presence of a small amount of an anhydrous alcohol as an activator. The dienyl sodium compound is then carboxylated with carbon dioxide at temperatures between about 30° to 100° C. (e.q. 60° C.) to produce the corresponding sodium salt of the acid. Finally the desired carboxylic acid can be obtained from the sodium salt by addition of hydrochloric acid or the like.

The resulting dicyclopentadiene dicarboxylic acid, is usually a mixture of endo and exo isomers if the carboxylation temperature is in the range of about −30° C. to 0° C. However, if the carboxylation is at about 50° to 100° C., the product is substantially all endo isomer. The above acid and its alkyl homologues have been found useful as a substitute for phthalic or maleic acids in a variety of reactions, as a starting material in the manufacture of polyester type lubricants and resins, and particularly in the manufacture of modified alkyd resins, as above described. However, in many of these uses the dicyclopentadiene dicarboxylic acid has various slight shortcomings. For instance, some of the previously known acids of this type have tended to undergo partial cracking as above mentioned, decarboxylation, as well as undesirable gelation when heated. As a result, some of the products prepared therefrom by means of high temperature reactions have lacked uniformity or may have exhibited undesirably dark color. However, the great preponderance of the products formed have been satisfactory.

As above-mentioned, hydrogenation of the aforementioned dicyclopentadiene dicarboxylic acid or of its alkyl substituted homologues gives dicarboxylic acids which are more stable and in some respects superior to the original unhydrogenated acids. For instance, unlike the unhydrogenated acids, the corresponding di- or tetra-hydrogenated compounds form perfectly stable diesters of alcohols of 1 to 13 carbon atoms, e.g. methyl, ethyl, iso-octyl, tridecyl, etc., which may be distilled without cracking, decarboxylation or polymerization.

However, alkyd resins produced from unhydrogenated, dicyclopentadiene dicarboxylic acids have special utility when used in conjunction with other reactive unsaturated materials since depolymerization and co-reaction may take place with beneficial effects. For example, alkyd resins produced from the unsaturated acids according to the present invention, when compounded and cooked with oleoresinous varnishes, having highly unsaturated oils as a component, form co-reactive products showing improved physical characteristics and performance. Also, it is obvious that it is less expensive to omit the hydrogenation step for those formulations where the improved thermal stability of the hydrogenated acids are not required.

The basic raw material from which essentially all of the compounds of this invention can be derived whether hydrogenated or unhydrogenated includes dicarboxylated dimers of cyclopentadiene, alkyl-substituted cyclopentadiene and mixtures thereof. Of foremost practical importance at present are dicyclopentadiene dicarboxylic acid, dimethyldicyclopentadiene dicarboxylic acid (which is a derivative of methylcyclopentadiene) and methyldicyclopentadiene dicarboxylic acid, which is a derivative of a mixture of cyclopentadiene and methylcyclopentadiene. Also, by hydrogenating the above dicyclodiene acids in such a manner that at least one, but preferably both of the double bonds originally present are saturated with hydrogen, the dihydro and/or tetra-hydro dicyclopentadiene dicarboxylic acids are formed as more fully described hereinafter. This hydrogenation can be illustrated by the following equations:

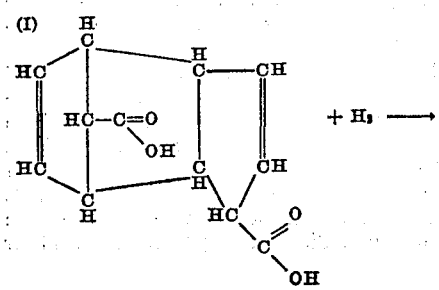

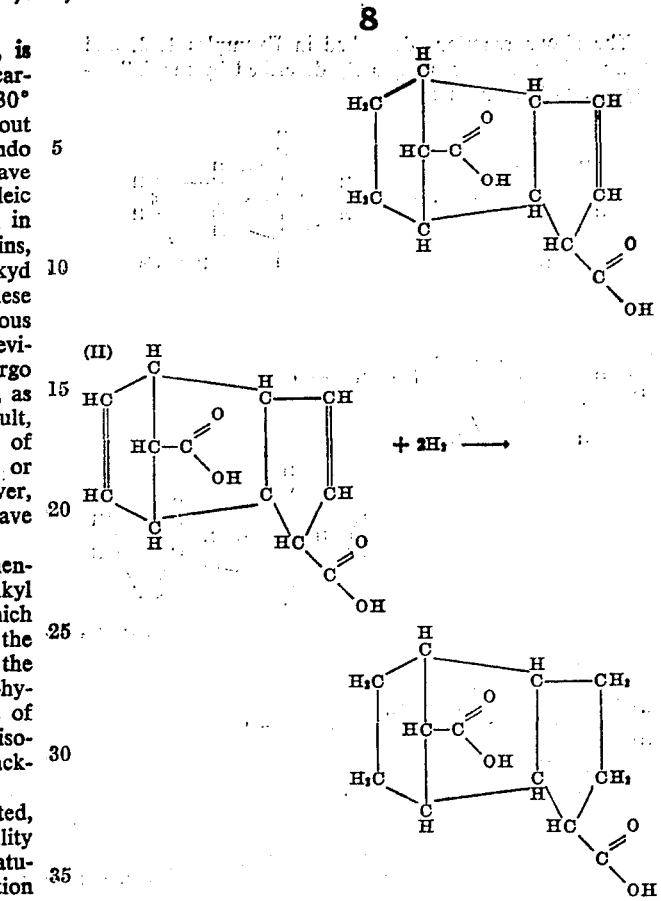

Either the dihydrogenated or the tetrahydrogenated acid can be made, depending on the amount of hydrogen allowed to react. When the hydrogenation is carried out, it proceeds in two distinct stages, and formation of the tetrahydrogenated acid normally does not begin until after the original acid was completely converted to the dihydroacid. Since the hydrogenation of the first double bond is substantially easier than the hydrogenation of the second double bond, the transition point between the two stages of the hydrogenation can be determined by following the hydrogen pressure drop. If it is desired to prepare the dihydro acid, either the proper amount of one mole of hydrogen per mole of acid can be charged to begin with, or an excess of hydrogen may be charged and the hydrogenation may be arrested as soon as a significant change in the rate of hydrogenation is observed.

The reaction proceeds similarly when the corresponding derivatives of methylcyclopentadiene and related more highly alkylated cyclopentadienes are used.

The hydrogenation can be carried out at hydrogen pressures of about atmospheric to 2000 p.s.i.g., preferably at 15 to 150 p.s.i.g., and with the aid of various catalysts such as Adams platinum oxide ($PtO_2$), Raney nickel, etc. Also, since the dicyclodiene dicarboxylic acids are relatively high melting solids, it is advantageous to add a suitable solvent to the reaction mixture in a quantity sufficient to dissolve the original dicarboxylic acid. Suitable solvents include alcohols such as methanol, ethanol, and isopropanol as well as other inert oxygenated solvents such as acetic acid, dioxane, ether, tetrahydrofuran, etc. The amount of solvent added may equal about 5 to 50 times the weight of the dicarboxylic acid. The hydrogenation is carried out at temperatures between about 20 to 100° C., preferably 30 to 80° C.

The actual working and nature of the invention is particularly illustrated by the following preparation of tetrahydrodicyclopentadiene dicarboxylic acid. In the following example, as throughout this entire specification, it will be understood that all amounts, proportions and percentages of materials are expressed on a weight basis unless indicated otherwise.

EXAMPLE 5

Twenty-two grams (0.1 mol) of dicyclopentadiene dicarboxylic acid was dissolved in 315 grams (i.e. 400 mls.) of anhydrous ethanol in a pressure bottle having a capacity of 1300 ml. and connected to a hydrogen storage tank having a capacity of 6810 ml. The free space in the system was 7625 ml. The dicarboxylic acid used was a white crystalline solid having a melting point of 210° C. and a neutralization equivalent of 509 mgm. KOH/gm. 100 mgm. of Adams $PtO_2$ catalyst was added to the alcoholic solution of the acid, the air exhausted from the bottle and the system was then filled with hydrogen to a pressure of 41 p.s.i.g. On shaking, there was an immediate absorption of hydrogen until the pressure dropped to 31.5 p.s.i.g., representing 0.2 mol of hydrogen absorbed in a period of about 30 minutes. The hydrogen pressure was observed to drop at a more rapid rate in the first part, corresponding to the formation of the dihydroacid, than in the latter part. At the end of the reaction the reaction mixture was filtered to separate the catalyst from the alcoholic solution and the alcohol was evaporated from the solution on a steam bath under an atmosphere of nitrogen. The solid residue was dissolved in 100 ml. of 50% ethanol and recrystallized.

The resulting tetrahydrodicyclopentadiene dicarboxylic acid product was recovered in an essentially quantitative yield in the form of snow white crystals, having a melting point of 193–194° C. on a copper bar. Titration of a sample weighing 0.3143 gram required 27.15 ml. of 0.1034 N alkali. This corresponds to an equivalent weight of 112.0 as against a theoretical weight of 112.1. A test for unsaturation by reaction with bromine indicated that the product was completely saturated. These analytical results are indicative of the high purity of the hydrogenated acid obtained. Reduction of dimethyl dicyclopentadiene dicarboxylic acid in the same manner as above, yields the tetra-hydro acid.

The dihydrodicyclopentadiene dicarboxylic acid was prepared in the same manner as just described, except that hydrogen was charged in an amount equal to only one mol per mole of dicyclopentadiene dicarboxylic acid. The separated product was recovered in the form of white crystals upon recrystallization from alcohol. When tested with bromine, it showed an unsaturation corresponding to one double bond per mole of the dicarboxylic acid product. The dihydroacid remained stable when heated under a blanket of nitrogen at a temperature of 250° C. for periods of 30 minutes and more, whereas the original unhydrogenated dicyclopentadiene dicarboxylic acid tends to decarboxylate and depolymerize at temperatures as low as 200° C. This increased stability is of great importance when the acid is to be used in various high temperature reactions such as the preparation of polyesters, etc.

Methyl esters of the unsaturated and fully saturated acids were prepared by refluxing the respective acids for six hours with an excess of methanol containing a small amount of sulfuric acid, removing the alcohol and inorganic acid and crystallizing from petroleum ether. Distillation of the two esters showed no decomposition for the hydrogenated material whereas the unhydrogenated ester cracked severely.

A series of alkyd resins were prepared from various dicyclopentadiene dicarboxylic acids. Examples 6 to 8, inclusive show resins which were prepared from unhydrogenated acids. Examples 9 and 10 show resins prepared from di-hydro dicyclopentadiene dicarboxylic acid (Example 9) and from tetra-hydro dicyclopentadiene dicarboxylic acid (Example 10).

EXAMPLES 6–10

A fatty oil-modified alkyd resin was prepared by cooking the following recipe:

"Recipe A"

| Component: | Part by weight |
|---|---|
| Fatty oil | 152.4 |
| 95% glycerol | 44.1 |
| Di Cp acids [1] | 129.0 |
| Lead oxide (PbO) | 0.04 |

[1] Dicyclopentadiene dicarboxylic acids.

In each example, an oil and glycerol were mixed and heated under an inert atmosphere of carbon dioxide, the lead oxide being added when the temperature reached 300° F. Heating was continued until a test sample was soluble in ten parts of methanol at which point the dicyclopentadiene dicarboxylic acids were added over a period of about one-half hour. The temperature was raised to either a temperature level of 375° F. or 425° F., as indicated in the examples, and held at said level until bodying was complete for the required times indicated hereinafter.

In Examples 6–8, the fatty oil-modified alkyd resins were produced from dicyclopentadiene dicarboxylic acid and cooked with soya oil, dehydrated castor oil, linseed oil, and soya oil, respectively.

In Examples 9 and 10, soya oil-modified alkyd resins were prepared by cooking the recipe hereinbefore designated as "Recipe A" except that an equivalent amount of the dihydro and tetrahydro dicyclopentadiene dicarboxylic acids were substituted for the unhydrogenated dicyclopentadiene dicarboxylic acids given in Examples 6 to 8.

For the purpose of comparing the alkyd resins of the present invention with a conventional alkyd resin, a control was likewise made up of the above "Recipe A" except that phthalic anhydride was used instead of the dicyclopentadiene dicarboxylic acids. The alkyd resins referred to above, were then reduced to a specified N.V.M. (non-volatile material content) by the addition of mineral spirits thereto, the inspections being shown in the following table.

TABLE.—CHARACTERISTICS OF ALKYD RESINS

| Example No. | Control | 6 | 7 | 8 | 9 | 10 |
|---|---|---|---|---|---|---|
| Acidic Material Used | Phthalic Anhydride. | Di Cp Acid [1] | Di Cp Acid [1] | Di Cp Acid [1] | Dihydro Di Cp Acid [1] | Tetrahydro Di Cp Acid [1] |
| Oil | Soya | Soya | Dehydrated Castor Oil. | Linseed | Soya | Soya. |
| Time to reach max. Temp. (hr.) | 3.0 | 2.8 | 2.8 | 2.8 | 3.0 | 2.0 |
| Max. Temp. of cook required, °F | 425 | 375 | 375 | 375 | 425 | 425 |
| Required Time at max. Temp. (Hrs.) | 16 | 1.2 | 2 | 2.5 | 3.5 | 2 |
| Wt. percent Oil in N.V.M. | 50 | 50 | 50 | 50 | 50 | 50 |
| Wt. percent Ester in N.V.M. | 50 | 50 | 50 | 50 | 50 | 50 |
| Wt. percent N.V.M. in Min. Sp. Soln.[2] | 50 | 50 | 50 | 50 | 50 | 50 |
| Viscosity: Gardner-Holdt | X–Y | Z–3 | U | Y | W | H. |
| Color: Gardner-1933 Std | 10 | 11 | 10.5 | 11.5 | 11 | |
| Acid Number (on N.V.M.) | 18 | 13 | 4 | 10 | 6.7 | |

[1] Di Cp=dicyclopentadiene dicarboxylic.
[2] May be varied between about 20–70 Wt. percent N.V.M. to form a varnish the resin preferably containing major proportions by weight of the resin solvent.

In the above Examples 6–10, compared to the control, it is shown that all alkyd resins of the present invention required drastically less time for cooking at the maximum temperatures (i.e. 1.2 to 3.5 hours) whereas the phthalic anhydride-type resin control required 16 hours. The resins of the present invention derived from hydrogenated dicyclopentadiene dicarboxylic acids required slightly higher cooking temperatures and a slightly longer cooking time than did the resins of the invention derived from unhydrogenated dicarboxylic acids. However, the resins derived from hydrogenated acids according to the invention, as pointed out before, are more stable upon exposure to heat.

EXAMPLE 11

Air dried films were drawn on mild steel panels from all resin solutions (i.e. varnishes containing 50% N.V.M.) of Examples 6–10 and also the control after incorporating therein 0.25 wt. percent of a commercial antiskinning agent (National Aniline Company's Antiskinning Agent "A.S.A."), lead naphthenate, and cobalt naphthenate (0.5 wt. percent lead and 0.05 wt. percent cobalt, percentages based on vehicle solids). The thicknesses of the dried films were uniformly 1.15±0.15 mil. The properties of the air dried films containing the alkyd resins prepared as in Examples 6–10 were compared to air dried films prepared from the conventional phthalic anhydride alkyd resin control, during drying for drying characteristics, and after drying for hardness, flexibility, water resistance, alkali resistance and grease resistance. In each instance the surface coatings made from the alkyd resins of the present invention derived from dicyclopentadiene dicarboxylic acid compounds were equal or superior to the above surface coating prepared from the conventional phthalic anhydride alkyd resin control; otherwise of the same formulation.

EXAMPLE 12

Similarly, films of all resins (50% N.V.M.) were drawn on the same steel and baked for 30 minutes at 300° F. in a forced air circulation oven. The films contained 0.25% of the commercial antiskinning agent of Example 11, and 0.02% cobalt as the naphthenate (based on the vehicle solids). The film thicknesses were 1.05±0.15 ml. The properties of the baked films of the varnishes (solutions) containing alkyd resins prepared as in Examples 6 to 10 were compared to baked films prepared from varnishes containing the conventional phthalic anhydride resin control during baking for drying characteristics, and after baking for hardness, flexibility, water resistance, alkali resistance and grease resistance. In each instance the surface coatings made from the alkyd resins of the present invention derived from dicyclopentadiene dicarboxylic acid, dihydro dicyclopentadiene dicarboxylic acid and tetrahydro dicyclopentadiene dicarboxylic acid were equal or superior to the above surface coating prepared from the conventional phthalic anhydride alkyd resin control; otherwise of the same formulation.

EXAMPLE 13

In a similar manner, black and white enamels were made from the 50% resin solutions of Examples 6 to 10 as well as the control. Enamels prepared from the resins of the present invention may contain about 1–50 wt. percent (preferably 2–32 wt. percent) of a pigment, the amount depending upon the nature of a specific pigment employed. Obviously common enamel pigments other than black or white pigments may be employed. The compositions of the white enamels of the present example were as follows:

31.9 wt. percent TiO$_2$ (Ti pure R–610)
31.9 wt. percent resin solids
36.2 wt. percent mineral spirits The compositions of the black enamels were:

2.09 wt. percent super spectra carbon black
38.79 wt. percent resin solids
59.12 wt. percent mineral spirits Panels were made from all resins on the same steel as above in Examples 11 and 12. In one series of tests the panels were coated with the enamel and air dried according to the general procedure of Example 11, whereas in another series of tests the panels were coated and baked according to the general procedure of Example 12. In each series of tests, the resulting enamel films produced according to the present invention were compared to films of enamels containing the conventional phthalic anhydride resin controls otherwise of the identical composition and under the identical conditions of drying or baking. All panels formed were then exposed to outdoor weathering tests. The enamelled panels prepared according to the present invention compared favorably with the control panels made from the phthalic anhydride alkyd resin control.

While there are above described a number of specific embodiments of the present invention, it is obviously possible to produce other embodiments and various equivalent modifications and variations thereof without departing from the spirit of the invention or the scope of the appended claims.

What is claimed is:

1. A process for preparing improved alkyd resins which comprises reacting 100 to 150 parts by weight of dicyclopentadiene dicarboxylic acid with 20 to 60 parts by weight of glycerol in the presence of 50 to 300 parts by weight of soya oil at a temperature between about 350 and 450° F. for about 1 to 4 hours.

2. A modified alkyd resin composition which comprises the product of the reaction of 20 to 60 parts by weight of glycerol, 100 to 150 parts by weight of tetrahydrogenated dicyclopentadiene dicarboxylic acid, and 50 to 300 parts of soya oil at a temperature between about 350° and 500° F.

3. A varnish which comprises the modified alkyd resin composition of claim 2 diluted with sufficient amounts of resin solvent to reduce the non-volatile material content to between about 20 and 70 weight percent based on said resin.

4. An enamel which comprises the modified alkyd resin of claim 2 diluted with sufficient amounts of resin solvent to reduce the non-volatile material content to between about 20 and 70 weight percent based on said resin, and containing between about 1 and 50 weight percent based on said enamel of a pigment.

5. A process for preparing improved alkyd resins which comprises reacting about 100 to 150 parts by weight of a dicyclopentadiene dicarboxylic acid selected from the group consisting of dicyclopentadiene dicarboxylic acid, methyl dicyclopentadiene dicarboxylic acid, dimethyl dicyclopentadiene dicarboxylic acid, the di- and tetrahydrogenated products of the first three members of this group, and mixtures thereof, with about 20 to 60 parts by weight of a trihydric alcohol in the presence of a coreactant selected from the group consisting of 40 to 70 weight percent of fatty oils based on the product alkyd resin and 30 to 60 weight percent of fatty acids based on said resin, at temperatures between about 350° and 500° F. until a substantial conversion of the reactants to an alkyd resin is obtained.

6. A process according to claim 5 wherein the coreactant is soya oil.

7. A process according to claim 5 wherein the coreactant is castor oil.

8. A process according to claim 5 wherein the acid is dihydrodicyclopentadiene dicarboxylic acid.

9. A process according to claim 5 wherein the acid is tetrahydrodicyclopentadiene dicarboxylic acid.

10. A process according to claim 5 wherein the acid is dimethyl dicyclopentadiene dicarboxylic acid.

11. A process according to claim 5 wherein the acid is dicyclopentadiene dicarboxylic acid.

12. A modified alkyd resin composition which comprises the product of the reaction at a temperature between about 350° and 500° F. of 20 to 60 parts by weight of a trihydric alcohol; 100 to 150 parts by weight of a dicyclopentadiene dicarboxylic acid selected from the group consisting of dicyclopentadiene dicarboxylic acid, methyl dicyclopentadiene dicarboxylic acid, dimethyl dicyclopentadiene dicarboxylic acid, the di- and tetrahydrogenated products of the first three members of this group and mixtures thereof, and a coreactant selected from the group consisting of 40 to 70 weight percent of fatty oils based on said resin composition and 30 to 60 weight percent of fatty acids based on said resin composition.

References Cited in the file of this patent

UNITED STATES PATENTS

| | | |
|---|---|---|
| 1,983,460 | Hopkins et al. | Dec. 4, 1934 |
| 2,397,240 | Butler | Mar. 26, 1946 |

OTHER REFERENCES

Thiele: Berichte, Deut. Chem., vol. 34, pages 68–70 (1901) (copy in Scientific Library).